United States Patent [19]
Reens

[11] Patent Number: 6,092,794
[45] Date of Patent: Jul. 25, 2000

[54] SECONDARY AIR HUMIDIFICATION HANDLER

[75] Inventor: Daniel J. Reens, Trumbull, Conn.

[73] Assignee: Cool Fog Systems, Inc., Trumbull, Conn.

[21] Appl. No.: 09/219,919

[22] Filed: Dec. 23, 1998

Related U.S. Application Data

[60] Provisional application No. 60/068,910, Dec. 29, 1997, abandoned.

[51] Int. Cl.$^7$ ........................................................ B01F 3/04
[52] U.S. Cl. .................................. 261/115; 261/DIG. 15; 261/DIG. 34; 96/355
[58] Field of Search ..................................... 261/115, 116, 261/117, 118, DIG. 15, DIG. 34; 96/355

[56] References Cited

U.S. PATENT DOCUMENTS

| | | | |
|---|---|---|---|
| 1,925,907 | 9/1933 | Norris | 261/DIG. 15 |
| 2,083,002 | 6/1937 | Branche et al. | 261/DIG. 34 |
| 2,143,269 | 1/1939 | Hubbard | 261/115 |
| 5,425,902 | 6/1995 | Miller et al. | 261/DIG. 34 |
| 5,525,268 | 6/1996 | Reens | 261/116 |

Primary Examiner—C. Scott Bushey
Attorney, Agent, or Firm—MacMillan, Sobanski & Todd LLC

[57] ABSTRACT

An air humidification system for the humidification of a zone includes supply ducts and return ducts extending from a first air handler. A second air handler has an enclosure sized to form a fog absorption region with a cross-sectional area that is greater than the cross-sectional area of the air conditioning ducting coupled to the zone. The enclosure has an intake and a discharge through which air passes. A compressor associated with the second air handler provides pressurized air for the generation of the fog for humidification. A fogger has a water input coupled to the pressurized water supply, an air input coupled to the pressurized air supply from the compressor, and a discharge port from which fog is produced. A humidification control is interposed between the supplies of pressurized air from the compressor and water to the fogger in the enclosure to produce fog from the fogger inside the second air handier when the humidification in the zone is below a desired set point. The enclosure has a drain through which water from the fog produced by the fogger can be discharged from the enclosure. A water droplet eliminator is located near the discharge of the enclosure to reduce the passage of non-evaporated fog from passing into the ducting.

10 Claims, 8 Drawing Sheets

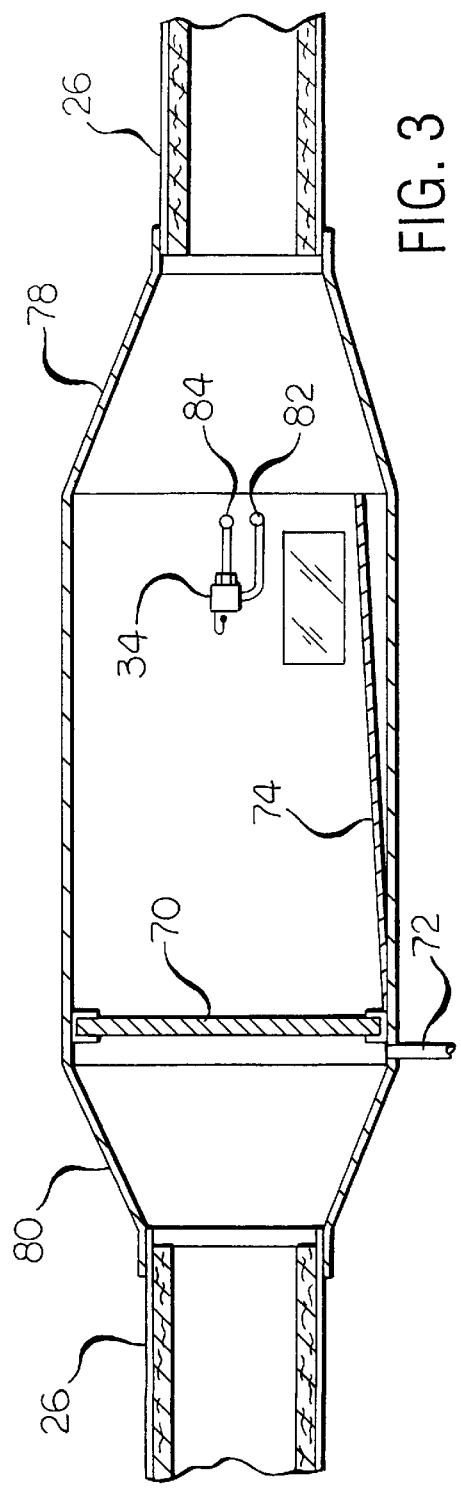
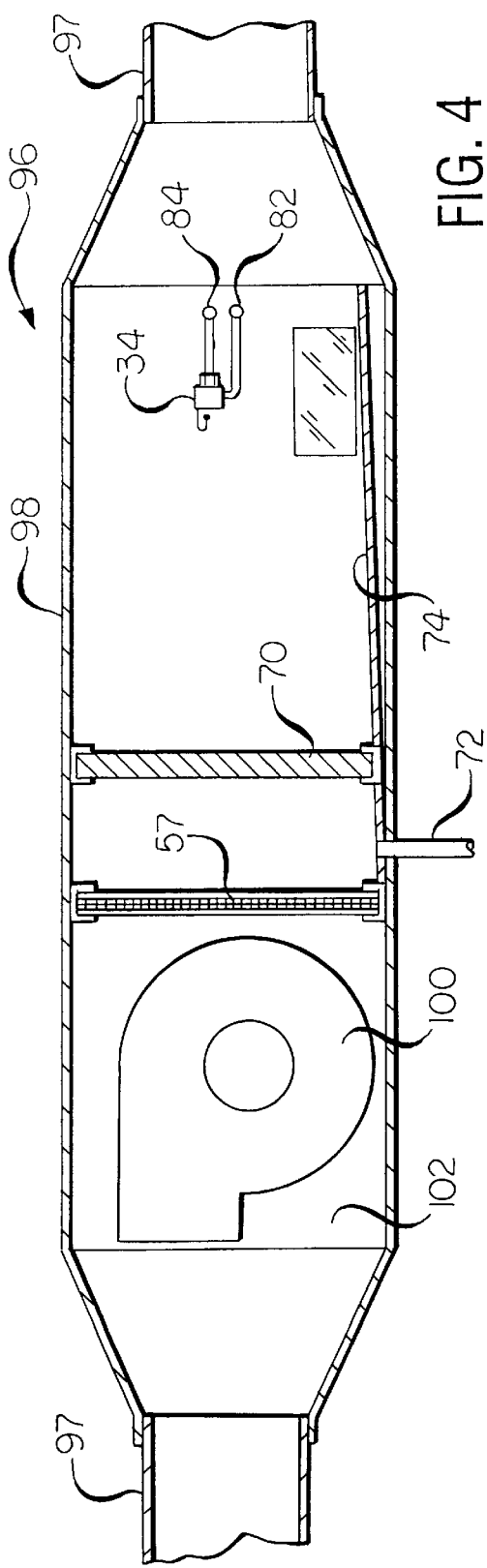

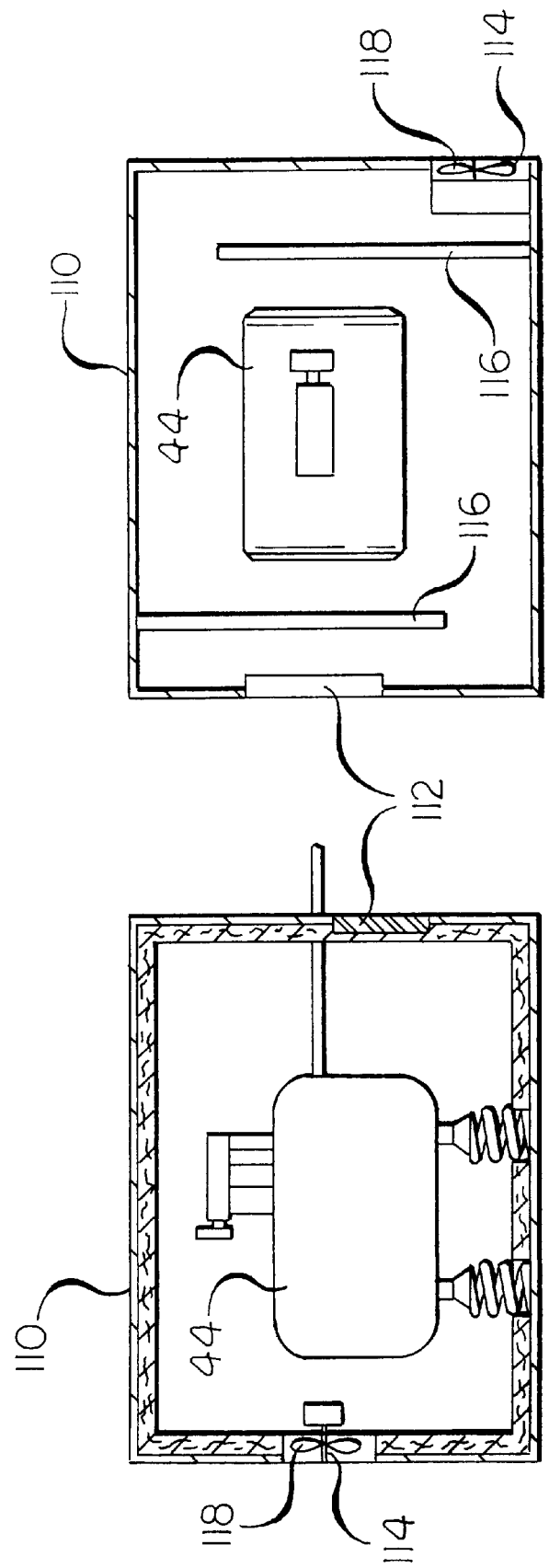

SECONDARY AIR HUMIDIFICATION HANDLER

PRIOR APPLICATION

This application incorporates and claims the benefit of U.S. Provisional Patent Application filed with the United States Patent and Trademark Office under Ser. No. 60/068,910 on Dec. 29, 1997 by Daniel J. Reens and entitled Secondary Air Humidification Handler.

FIELD OF THE INVENTION

This invention generally relates to a system for the humidification of relatively small spaces such as houses, apartments, specific office or industrial areas and the like. More specifically this invention relates to a humidification system that can be incorporated with standard air conditioning ducting used typically for such relatively small spaces.

BACKGROUND OF THE INVENTION

Humidification systems for spaces have been available in the market place for many years. One such system for example involves one or more foggers of the type which are supplied with pressurized water and air as described for example in the U.S. Pat. No. 5,525,268. In the '268 patent a standard control system for supplying humidification is described using foggers that require pressurized air and water. The air pressure is kept at a higher fixed differential pressure to that of the water pressure. The control is capable of delivering a precise regulation over the humidification of the space. In such system for a large installation a large number of foggers are arranged in an array across an air flow inside an air handler and the humidified air is distributed to the particular areas that need to be humidified. Humidification has been proposed to be done either in the air handler or in the supply air or return air ducts.

The large air handler, typically used in large industrial or commercial facilities, is part of an air conditioning system having, inside a main air handler unit, both cooling and heating coils, dampers, a fan and appropriate controls to regulate the heating or cooling as required. In smaller home type central air conditioning systems air from a smaller air handler is distributed through supply ducts to the various rooms in the house and return air passes through return ducts to the small air handler. Frequently, several such small air handlers, each for a separate zone, are used for a house depending upon the most economical way to distribute the conditioned air. Typically, the air handlers include both heating and cooling coils for the different seasons.

Various schemes have been proposed to humidify a home. Sometimes the central air unit is provided with a source of steam or spray or fog or sometimes individual fog emitting units are used and some rely on piezo-electric devices. The individual units are placed in the rooms to be humidified and can work satisfactorily for that particular space, though care must be taken to maintain the cleanliness of the device, avoid the use of highly mineralized water and prevent the build up of bacterial build-up from standing water.

When an entire house is to be humidified, it would be more practical to use the available ducting to distribute humidified air. Spraying inside a standard sized duct, however, can lead to undesirable condensation of inside walls of the ducts and thus a pooling of water. Many current systems have reservoirs of water that are potential breeding grounds for microbial growth. Standing water thus can lead to health problems and as a result humidification through central air units in a house has not generally been satisfactory. Nor have conventional air humidification systems been found to be sufficiently reliable and practical for residential and small commercial applications.

Humidification of a home is well known to have significant benefits such as better air for breathing and nasal passages, reduction in the spread of airborne viruses, prevention of damage to wood furniture or floors and other articles from excessively dry air during winter time and a certain amount of scavenging of undesirable air components, such as spores, molds, chemicals and the like as these are either entrained or chemically altered and then removed by filters in the central air unit.

Humidification of air requires a source of water and for the above described system in the '268 patent a supply of pressurized air to deliver an adequate quantity of fog to humidify an air stream. When the water source includes a large quantity of minerals, as is often the case for homes relying upon artesian wells, the use of this water can lead to a clogging of the fogger head in some cases and the injection of these minerals in powder form into the home. This injection tends to be undesirable and can be unhealthy but is particularly onerous by leaving a fine film of dust on all surfaces throughout a house. One known technique used to remove minerals from the water involves a reverse osmosis filtration device with which the minerals can be sufficiently removed to provide a clean source of water for air humidification.

SUMMARY OF THE INVENTION

With one air humidification system in accordance with the invention a first air handler supplies conditioned air, usually in an amount of less than about 2000 $Ft^3$/minute to a second air handler enclosure in which a fog producer is located. The second air handler has a cross-section that is usually made larger than that for the ducts which provide the air flow from the first air handler so that the air flow can be sufficiently slowed to facilitate its humidification. The humidification can be reliably provided with a fogger of the type which requires both pressurized air and water in the manner as described in U.S. Pat. No. 5,525,268, which is, therefore, incorporated herein in its entirety by reference thereto. When minerals are present in the water a small reverse osmosis assembly is used to provide the required clean water for the fogger. The fogger is placed in the vicinity of the intake of the second air handler enclosure so that the fog has an opportunity to be absorbed into the air stream and thus reduce the presence of standing water.

With the use of a second air handler located in tandem with the first air handler, a humidification system in accordance with the invention can be conveniently added on to an existing central air conditioning system. The use of the term "air conditioning" herein refers to a system capable of either heating or cooling, depending upon the season, of a flow of air produced by a fan controlled by the system. The second air handler is specifically designed to enable the air to be humidified with a fog produced by standard well known devices. For the preferred embodiment such fog is delivered with a fogger which requires both pressurized air and water, though other types of well known foggers which do not require a pressurized supply of air can be used.

When a compressor is needed to provide pressurized air to the fogger, the compressor size is preferably limited, for cost and efficiency, to serve the desired secondary air handler's humidification. The compressor further needs to be placed within a reasonable distance from the secondary air handler and has to be sufficiently quiet to avoid intrusive sound interference.

It is, therefore, an object of the invention to provide a system for the humidification of residences and small commercial and industrial zones. Another object of the invention is to provide a humidification system, which can be conveniently added on to an existing central air conditioning system. It is a further object of the invention to provide a humidification system which is effective in delivering humidification to a small space such as a residence and thus provide physical benefits such the elimination of noise bleeds attributable to excessively dry air in sleeping areas.

These and other advantages and objects of the invention can be understood form the following detailed description of several embodiments in accordance with the invention as illustrated in the drawings.

BRIEF DESCRIPTION OF THE DRAWINGS

FIG. 3 is a side view in elevation of a second air handler used in a system in accordance with the invention;

FIG. 4 is a side view in elevation of another second air handler system in accordance with invention;

FIG. 5 is a partial section and broken away view of a muffled air compressor and housing used in a humidification system of this invention;

FIG. 6 is a top sectional view of the muffled air compressor and housing of FIG.

DETAILED DESCRIPTION OF DRAWINGS

Figure 1:
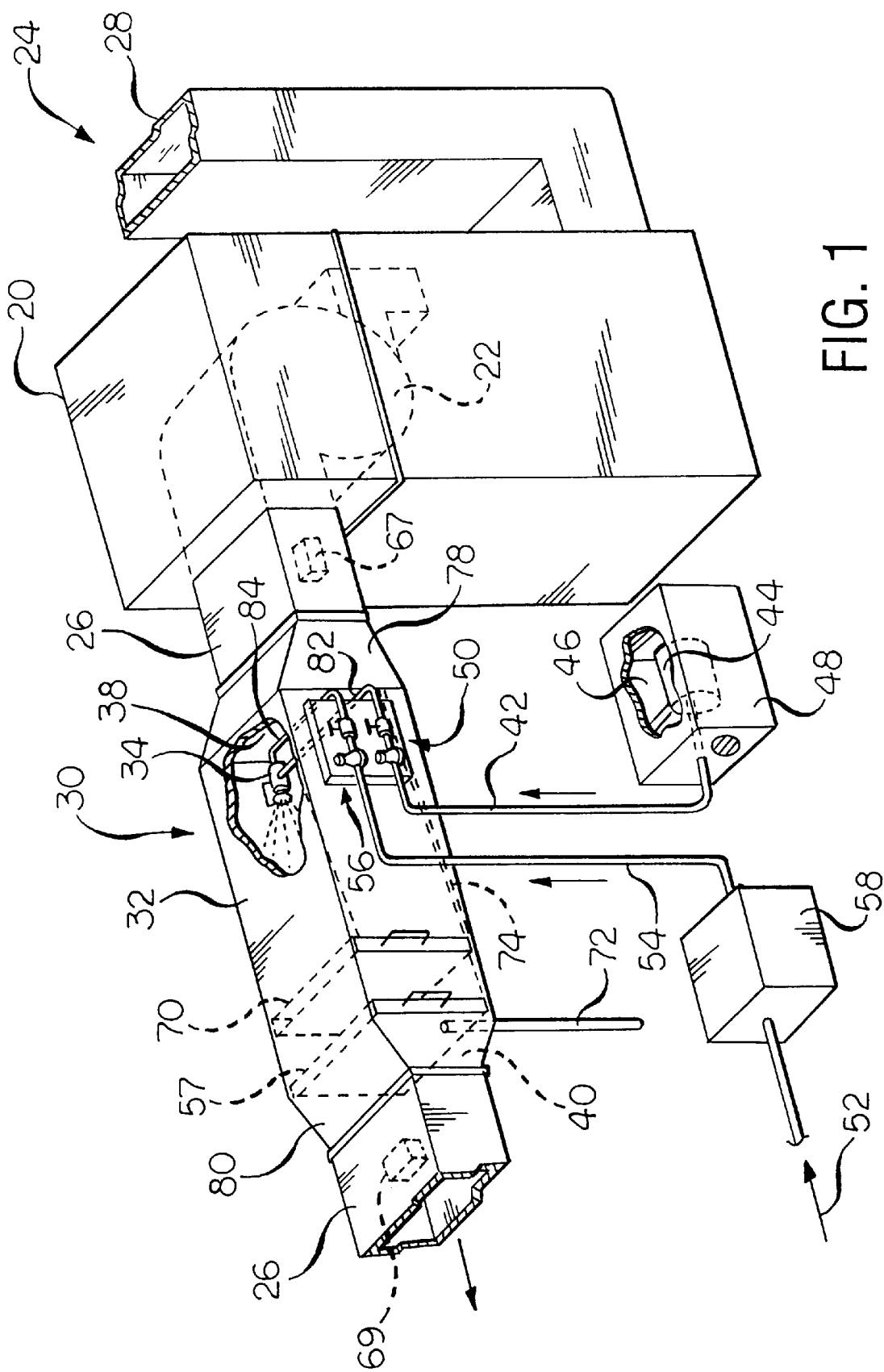
FIG. 1 is a perspective view of a humidification system in accordance with the invention and installed onto a conventional central air system.

With reference to FIGS. 1 and 3 a standard or conventional primary air handler is shown at 20. This air handler includes appropriate heater and cooling coils, not shown, and controls for regulating the temperature of air flow though the primary air handler 20 as well as the fan 22. Fan speed can be fixed and its on and off state regulated depending upon the desired temperature or the fan speed can be varied. Air flow from primary air handler 20 is typically less than about 2000 ft$^3$ per minute and is directed through ducting 24 to the various zones in a structure, which can be a house, commercial building or the like. The ducting includes supply ducts such as 26 and return ducts such as 28 with vents, not shown, located at the ends of the supply ducts 26 and intake vents, not shown, located at the entry to the return ducts 28. The control for the primary air handler is a conventional control as are well known and is not a part of this invention. In a home it will not be unusual to see several primary air handlers, each controlling the air condition for a separate zone.

Air humidification can be included in a primary air handler 20 as indeed this has been done for many years. Typically, humidification is provided using either steam or by wetting a cooling coil with a supply of water. A common and preferred technique involves the use of foggers in a primary air handler and which introduce a supply of fog into the air stream going through the primary air handler 20. The foggers utilize pressurized air and water in a manner as described in the incorporated previously identified '268 patent. The use of foggers, however, requires a sufficient space to enable the fog to evaporate as the air stream entrains the fog. Such evaporation preferably occurs before droplets in the fog encounter any surfaces so as to reduce their wetting. Such extended space is not available in many common air handlers, particularly those which are used for relatively small zones such as encountered in residences and small commercial areas.

With a humidification system in accordance with the invention a second air handler is provided in tandem relationship with the primary air handler 20. The second air handler 30 includes a prefabricated chamber 32 of sufficient cross-section to slow the air speed usually present in the supply ducts 26 into a range of 300 to about 800 feet per minute. Such air speed typically will require an increase in cross-sectional area relative to the connected ducting. The fog chamber 32 is designed to be installed in an existing or new ventilation duct distribution network such as is commonly encountered in residences or offices. This facilitates the humidification of the air stream by one or more foggers 34 which use compressed air and water to create a very small water droplet size to make artificial fog that can readily evaporate into the air stream. Instead of foggers 34 other types of humidification devices could be used such as piezo-electric or atomizers all of which can operate within a prefabricated chamber 32.

Second air handler 30 is shown formed of a rectangular enclosure having an intake end 38 and a discharge end 40. However, other shapes for the fog chamber 32 can be used. The second air handler 30 is inserted in the supply duct 26, though as will be explained it can be inserted in the return duct 28.

The second air handler includes a water injector in the form of a fogger 34 which preferably is of the type as more particularly described in U.S. Pat. No. 5,525,268. Fogger 34, therefore, uses pressurized air and water with air pressure a desired amount above the pressure of the water in order to maintain a proper fog pattern. The pressurized air is supplied through a line 42 from a small compressor 44 located within a muffling housing 46 with an air storage tank 48, which may be inside the housing 46 or preferably is outside it. The pressurized air is applied through air control 50 to the fogger 34.

Pressurized water is typically obtained from a domestic or otherwise locally available water supply suggested by arrow 52 and supplied through line 54 to a water pressure control 56 which controls to the desired pressure level and thence to fogger 34. When needed, a mineral remover such as can be provided by a reverse osmosis system 58 is used before the supply of water reaches the control 56. When the water quality is reasonable in terms of low mineral content no special water treatment is needed and a filter 57 can be employed at the discharge end 40 to capture most of the solids made airborne by the fogging process. The air pressure control 50 and the water pressure control 56 are interrelated in a manner as more particularly described in the aforementioned incorporated U.S. Pat. No. 5,525, 268. Briefly stated this interrelationship establishes a fixed predetermined pressure differential whereby the air pressure is a certain amount of pounds higher than the water pressure.

Figure 1A:
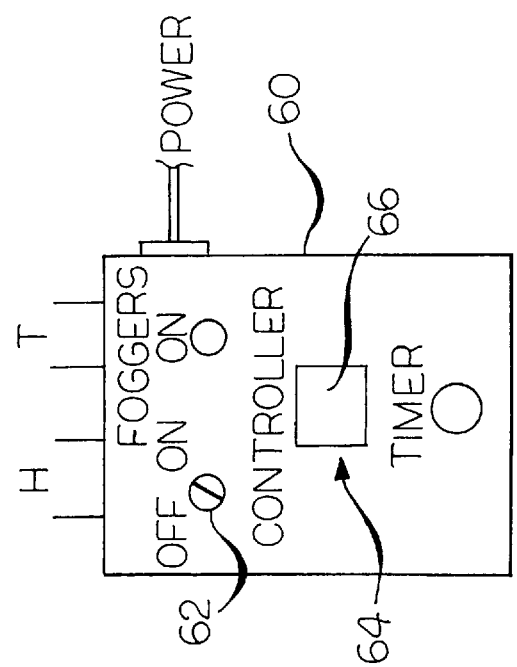
FIG. 1A is a front elevation view of a central controller for use with the humidification system of this invention.

The air and water pressure controls 50, 56 are shown mounted on the second air handler enclosure 32, though as illustrated in FIG. 1A, and as is well known the controls can be in a common panel enclosure 60, which then can be mounted on a wall or other suitable surface near the second air handler 30. Panel enclosure 60 includes an on/off main switch 62 with which electrical power to the compressor 44, the controls 50 and 56 and to other parts of the system can be controlled. In addition panel enclosure 60 includes a programmable controller 64 with a display 66 with which humidification set points and other parameters are regulated with one input, H, being provide from a humidistat 67 usually located inside the return duct 28. Another input is an excess humidity sensor 69 located on the supply side of the air stream and is typically sensed at the discharge of the second air handler 30. The humidistat 69 provides a safety control signal whereby excessive humidification of the air stream can be avoided. Such control features are well known in the art.

Prefabricated second air handler enclosure 32 has a water droplet collector 70 so that any water droplets entrained by the air stream do not get into the ducting 26 connected to the discharge end 40 of the enclosure 32. The enclosure has a drain 72 located near the discharge end 40 and the bottom 74 of the enclosure 32 is sloped towards the drain 72 to assure the proper collection and removal of any water formed in the second air handler 30 from saturation, impingement, droplet agglomeration, etc. An access door in the form of a sliding gate is provided to service the collector 70 as well as any other equipment.

In order for all or at least most of the water from fogger 34 to evaporate before the air stream re-enters the supply duct 26, it is preferred to slow the air flow. This obtained by making the cross-section of the second air handler sufficiently large. Thus duct transitions 78, 80 are provided respectively at the intake and discharge ends 38, 40 to provide a smooth transition into and out of the second air handler enclosure 32. The precise dimensions for the second air handler and thus the transitions 78, 80 can vary, with the intent to reduce the air speed to preferably in the range from about 300 to about 800 feet per minute and preferably below about 500 feet per minute within the enclosure 32.

Another factor in the sizing of the second air handler enclosure 32 is to minimize the amount of fog from fogger 34 to condense on adjacent walls of the enclosure. The fogger 34, therefore, preferably is located generally centrally within a cross-sectional plane near the intake 38. The mounting of fogger 34 can be from the respective air and water supply tubes 82, 84 extending from the controls 50, 56.

Figure 2:
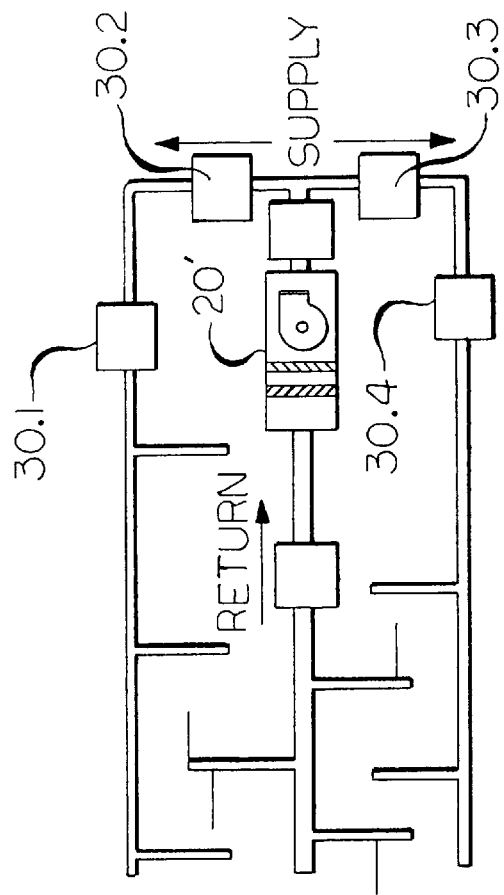
FIG. 2 is a plan schematic view of several humidification systems in accordance with the invention installed onto a central air conditioning system.

With a second air handler system 30 in accordance with the invention small spaces such as residences can be humidified in an economical manner. Clean water from the reverse osmosis system avoids the discharge of water minerals into the humidified space and the controller 64 enables a precise control over the degree of humidification. A number of these systems can be provided as illustrated in the view of FIG. 2 wherein a primary air handler 20' is coupled to a ducting network 90 leading to various zones in a residence or commercial facility. A number of second air handlers 30.1–30.4 are shown for use with particular zones or spaces within the facility being humidified. The drawing of FIG. 2 is, therefore, to be construed as illustrative and is not to scale.

For some applications the primary air handler 20 of FIG. 1 may not allow the integration of a prefabricated fog chamber 32. This can happen for, instance, when the primary air supply is maintained at a temperature that is too cold for efficient humidification. Another instance may arise when the damper configuration for the air supply allows only a minimal amount of air required to maintain the desired temperature set point for the space to be humidified. This can then preclude maintaining proper humidification levels.

When the primary air handler precludes the integration of a prefabricated fog chamber in the manner as shown for FIG. 1 then the prefabricated chamber 32 can be coupled to an independent duct network dedicated for humidification of the space with an appropriately sized fan to move the air through this independent duct network. FIG. 4 shows such a second air handler 96 in accordance with the invention for use with an independent ducting 97. A primary air handler in such case still controls air flow through the space to provide heat and other air conditioning needs. The second air handler 96 is shown with an enlarged enclosure 98 to accommodate a fan 100 at the discharge end 102 to provide additional air flow to the space to be humidified.

FIGS. 5 and 6 illustrate a sound dampening for a compressor when it is used within a residential or office structure. Particular care must be taken to reduce compressor noise and thus a sound dampening enclosure 110 is formed around compressor 44 to lower noise between about 15 and 20 db. The enclosure 110 has thickened walls and preferably sound absorbing material on the inner walls. Since the enclosure must be vented to discharge heat from the compressor 44, an air flow passage leading from an intake opening at 112 to a discharge 114 are provided and separated by baffles 116. A fan 118 is mounted in the discharge 114 to enhance the air flow through the enclosure 110.

Figure 7:
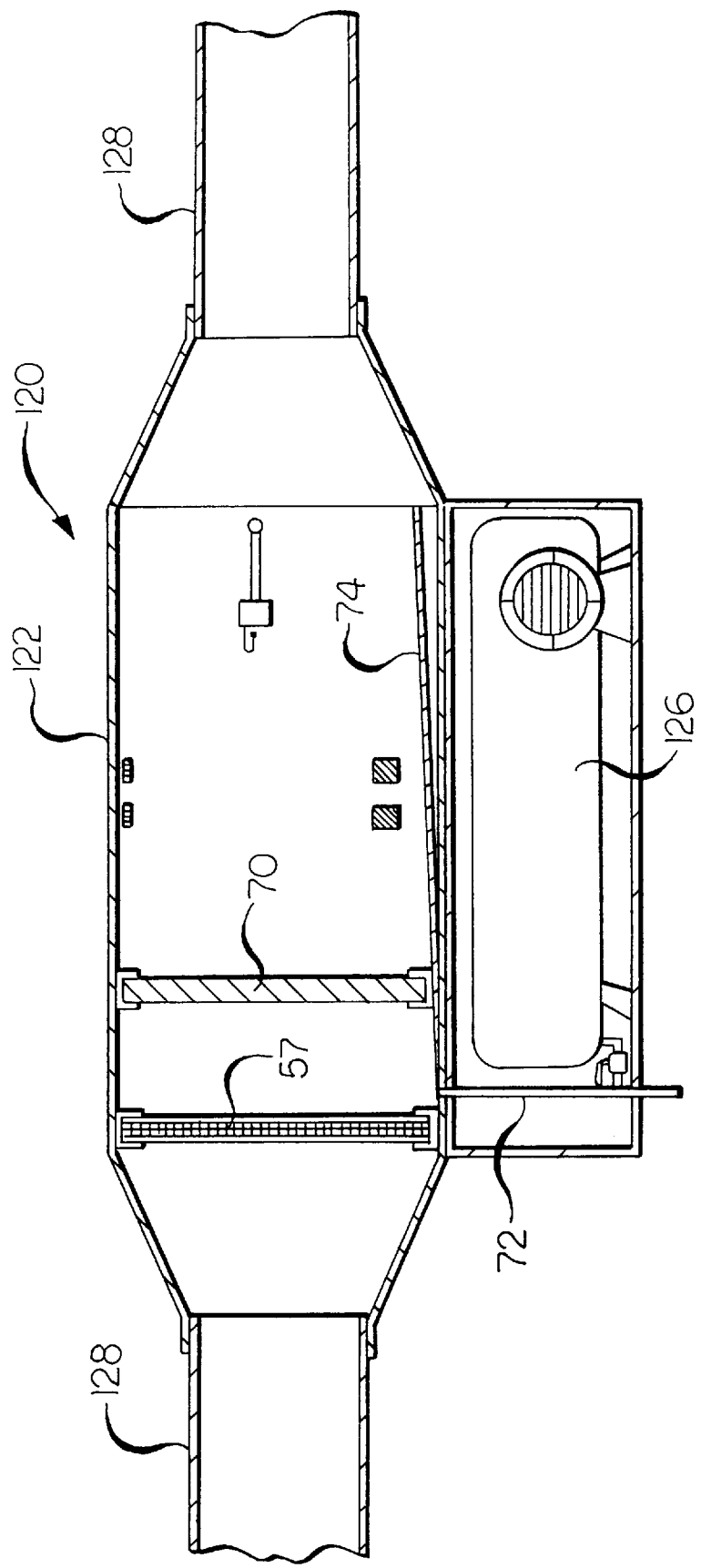
FIG. 7 is a side view in elevation of another second air handler of this invention.

FIG. 7 illustrates a prefabricated second air handler 120 having a fog chamber 122 mounted on top of an enclosure 124 for a compressor 126. Supply ducts 128 connect to chamber 122.

Figure 8:
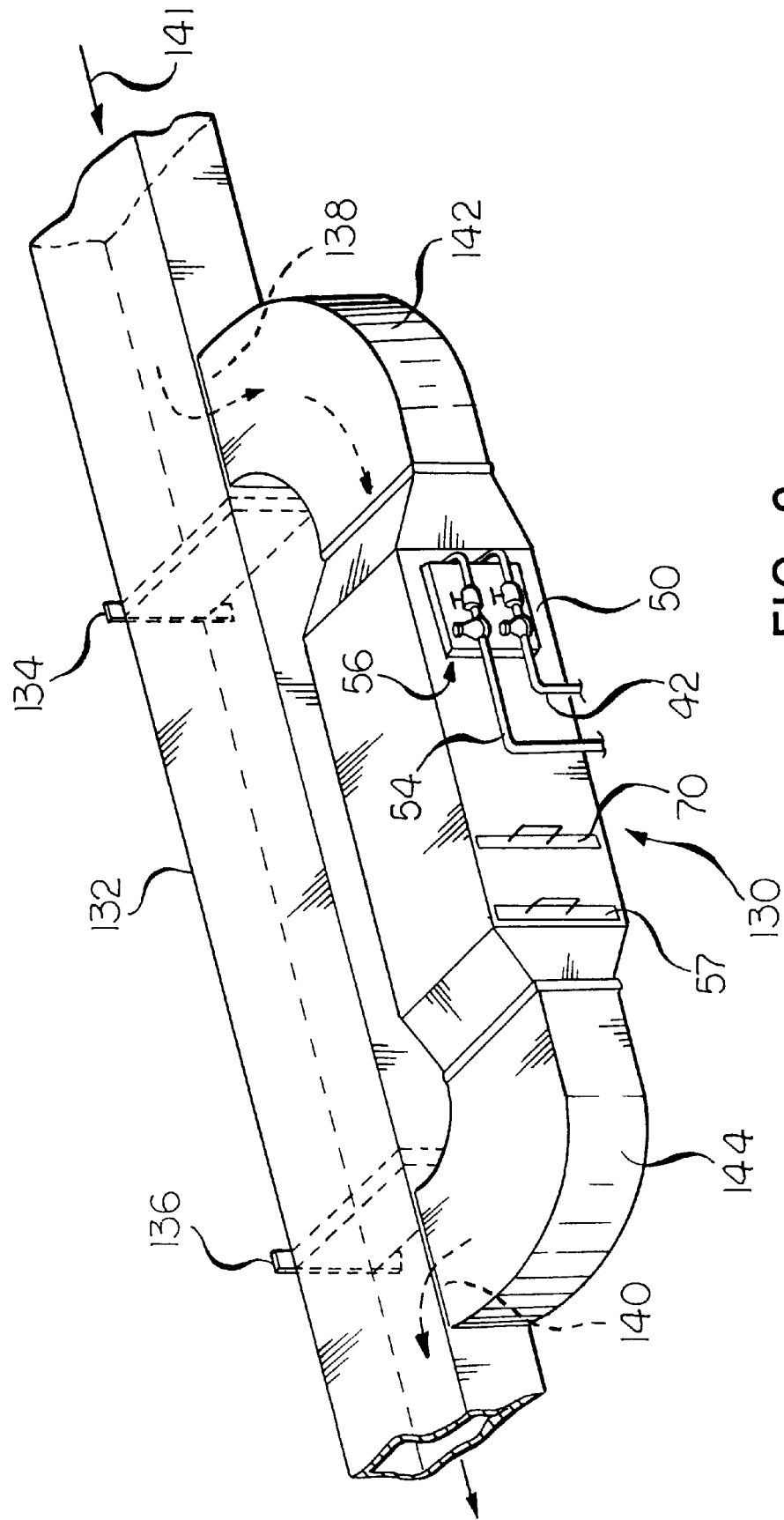
FIG. 8 is a perspective view of another second air handler installation of this invention.

FIG. 8 illustrates one technique for coupling a second air handler 130 to a horizontal supply duct network 132 coupled to a primary air handler (not shown). The supply duct 132 can be, for example, suspended from floor joists in a basement or the like. A pair of slide gates 134 and 136 are inserted into duct 132 and an intake opening 138 and discharge opening 140 are made into the smaller dimension wall of duct 132. Curved ducts 142, 144 are then attached to duct openings 138, 140 and connected to the second air handler 130. The gates enable one to bypass the second air handler 130 and to assure the proper diversion of the air stream 141 into the fog chamber of the handler 130 when so needed.

Figure 9:
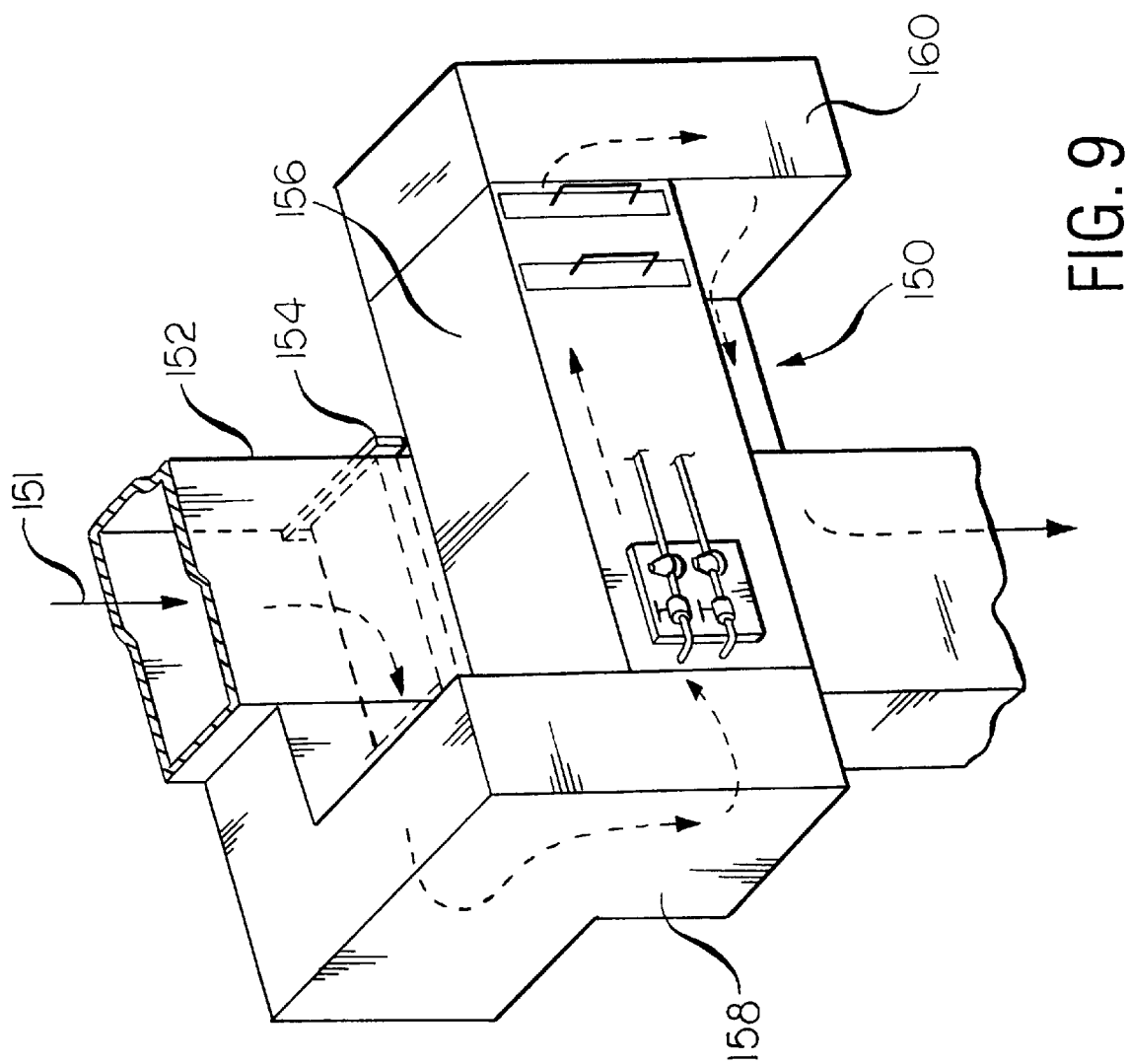
FIG. 9 is a perspective view of still another second air handler installation of this invention.
Figure 10:
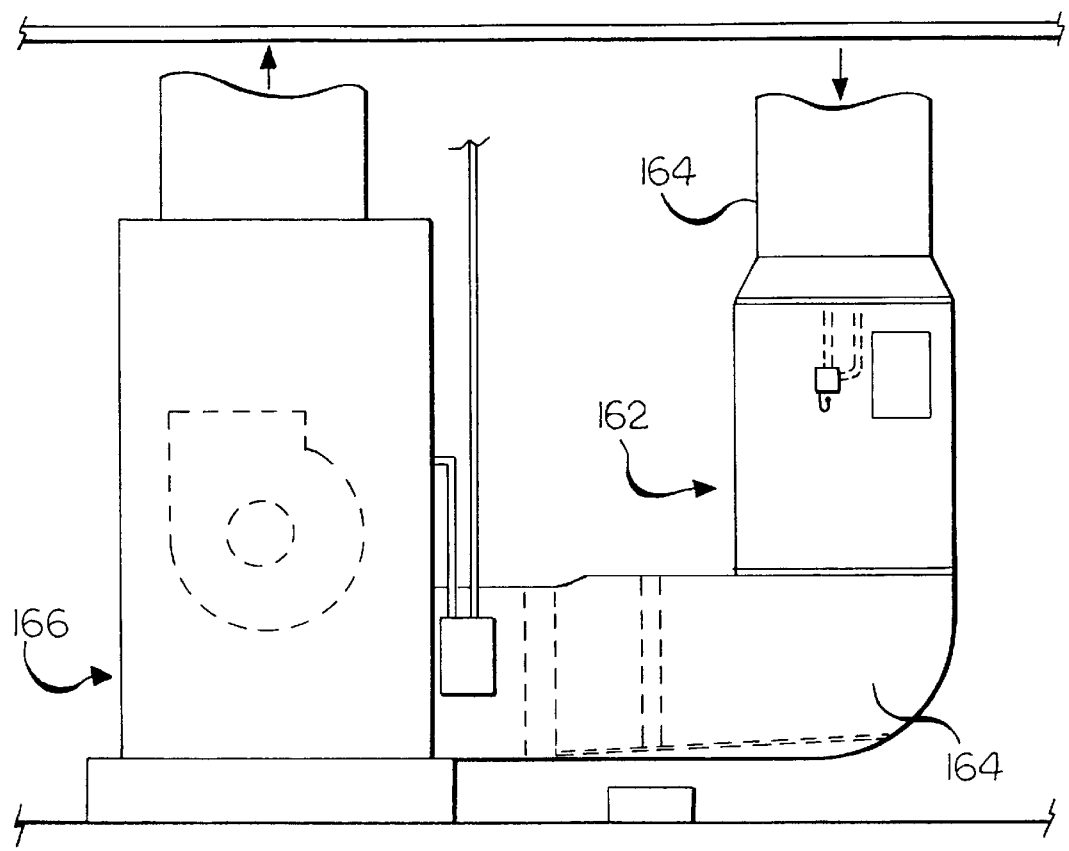
FIG. 10 is a front view in elevation of a second air handler installation of this invention on the return side of a primary air handler.

FIG. 9 illustrates the coupling of a second air handler 150 in accordance with the invention to a vertically oriented duct 152 using a gate 154 to divert the air flow 151 through the fog chamber 156. Rectilinear ducts 158 and 160 are used to couple the fog chamber 156 to duct 152. FIG. 10 illustrates the placement of a second air handler 162 in accordance with the invention in the return duct 164 leading to a primary air handler 166.

Having thus described several embodiments for a second air handler in accordance with the invention for the humidification of an air stream conditioned by a primary air handler the advantages of the invention can be appreciated. Variations of the embodiments can be made by one skilled in the art without departing from the scope of the invention.

What is claimed is:

1. An air humidification system for the humidification of a residential or small commercial or industrial zone wherein the zone has air conditioning ducting formed of supply ducts and return ducts extending from a first air handler providing air flow in an amount generally less than about two thousand cubic feet per minute to the zone to be humidified with pressurized air and pressurized water from a water supply, comprising:

a second air handler having an enclosure sized to form a fog absorption region with a cross-sectional area that is greater than the cross-sectional area of the air conditioning ducting coupled to the zone and which enclosure has an intake and a discharge through which air passes, a compressor associated with said second air handler to provide pressurized air thereto for the generation of said fog for humidfication of air flow in said second air handler;

a fogger having a water input coupled to the pressurized water supply and having an air input coupled to the pressurized air supply from the compressor and a discharge port from which fog is produced, said fogger being located near the vicinity of the intake of the enclosure to discharge fog into the enclosure;

a humidification control interposed between the supplies of pressurized air from the compressor and water to the fogger in the enclosure to produce fog from the fogger inside the second air handler when the humidification in the zone is below a desired set point, said enclosure having a drain through which water from the fog produced by the fogger can be discharged from the enclosure; and a water droplet eliminator located near the discharge of the enclosure to reduce the passage of non-evaporated fog from passing into the ducting.

2. The humidification system as claimed in claim 1 and further including a muffler enclosure surrounding the compressor to suppress noise therefrom.

3. The humidification system as claimed in claim 2 wherein said compressor is mounted on vibration isolators.

4. The humidification system as claimed in claim 2 wherein said second air handler further is provided with a duct transition having a gradually varying cross-section located between the enclosure and the ducting to enable a smooth flow of air into and out of the enclosure of the second air handler.

5. The humidification system as claimed in claim 1 wherein said humidification control is mounted to said enclosure of the second air handler.

6. The humidification system as claimed in claim 1 and further including a fan and located downstream with respect to said air flow in said enclosure to enhance the air flow there through.

7. The humidification system as claimed in claim 1 wherein said enclosure is mounted integrally with said compressor.

8. The humidification system as claimed in claim 7 and a muffler housing enclosing said compressor and located adjacent to said enclosure of the second air handler.

9. An air humidification system for the humidification of a residential or small commercial or industrial zone wherein the zone has air conditioning ducting formed of supply ducts and return ducts extending from a first air handler providing air flow in an amount generally less than about two thousand cubic feet per minute to the zone to be humidified with pressurized air and pressurized water from a water supply, comprising:

a second air handler having an enclosure sized to form a fog absorption region with a cross-sectional area that is greater than the cross-sectional area of the air conditioning ducting coupled to the zone and which enclosure has an intake and a discharge through which air passes, an inlet duct operatively coupled at a junction to said supply duct and connected to said intake of said enclosure to bypass air flow from the supply duct to said enclosure;

a discharge duct coupled between said discharge of the enclosure to said supply duct to return air thereto from said second air handler so as to place the second air handler in parallel with the air flow through said supply duct; and an air flow gate located inside the supply duct and downstream of said junction to force air flow from said supply duct through said second air handler;

a compressor associated with said second air handler to provide pressurized air thereto for the generation of said fog for humidfication of air flow in said second air handler;

a fogger having a water input coupled to the pressurized water supply and having an air input coupled to the pressurized air supply from the compressor and a discharge port from which fog is produced, said fogger being located near the vicinity of the intake of the enclosure to discharge fog into the enclosure;

a humidification control interposed between the supplies of pressurized air from the compressor and water to the fogger in the enclosure to produce fog from the fogger inside the second air handler when the humidification in the zone is below a desired set point, and a drain in said enclosure through which water from the fog produced by the fogger can be discharged from the enclosure.

10. The air humidification system as claimed in claim 9 wherein said enclosure further includes a water droplet eliminator located near the discharge of the enclosure to reduce the passage of non-evaporated fog from passing into the ducting.

* * * * *